(12) United States Patent
Gouge

(10) Patent No.: US 10,100,978 B2
(45) Date of Patent: Oct. 16, 2018

(54) GREASE DISTRIBUTION SYSTEMS AND METHODS

(71) Applicant: Lee C. Gouge, Shreveport, LA (US)

(72) Inventor: Lee C. Gouge, Shreveport, LA (US)

( * ) Notice: Subject to any disclaimer, the term of this patent is extended or adjusted under 35 U.S.C. 154(b) by 218 days.

(21) Appl. No.: 15/161,747

(22) Filed: May 23, 2016

(65) Prior Publication Data

US 2017/0336022 A1   Nov. 23, 2017

(51) Int. Cl.
*F16N 13/22* (2006.01)
*F16N 11/00* (2006.01)
*F16N 7/38* (2006.01)
*F16N 25/00* (2006.01)

(52) U.S. Cl.
CPC ............ *F16N 13/22* (2013.01); *F16N 7/385* (2013.01); *F16N 11/00* (2013.01); *F16N 25/00* (2013.01); *F16N 2210/00* (2013.01); *F16N 2250/04* (2013.01); *F16N 2250/40* (2013.01); *F16N 2280/00* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,813,836 B2 * | 10/2010 | Wang | ................... | G05D 1/0038 180/169 |
| 8,376,046 B2 * | 2/2013 | Broussard, II | .......... | E21B 43/26 166/308.1 |
| 8,839,867 B2 * | 9/2014 | Conrad | ................... | E21B 43/26 166/177.5 |
| 8,905,056 B2 * | 12/2014 | Kendrick | .............. | E21B 21/062 137/15.01 |
| 8,978,763 B2 * | 3/2015 | Guidry | .................... | E21B 43/26 166/308.1 |
| 9,068,450 B2 * | 6/2015 | Guidry | .................... | E21B 33/03 |
| 9,222,345 B2 | 12/2015 | Conrad | | |
| 9,255,469 B2 | 2/2016 | Conrad | | |
| 2009/0050311 A1 * | 2/2009 | Crawford | ................ | E21B 19/22 166/90.1 |
| 2010/0051272 A1 * | 3/2010 | Loree | ....................... | C09K 8/64 166/279 |
| 2010/0300672 A1 * | 12/2010 | Childress | ................ | E21B 43/26 166/52 |
| 2011/0030963 A1 * | 2/2011 | Demong | ................. | E21B 43/26 166/313 |
| 2013/0233560 A1 * | 9/2013 | Davidson | ................ | E21B 43/26 166/308.1 |
| 2015/0218440 A1 * | 8/2015 | Johnson | .................. | E21B 43/26 166/308.1 |
| 2015/0345272 A1 * | 12/2015 | Kajaria | ............... | E21B 41/0092 166/250.01 |
| 2016/0024857 A1 | 1/2016 | Guidry | | |

(Continued)

*Primary Examiner* — Michael A Riegelman
(74) *Attorney, Agent, or Firm* — R. Keith Harrison

(57) ABSTRACT

Grease distribution systems for lubricating a plurality of fracking valves on a wellhead include a distribution manifold configured for mounting on or adjacent to the wellhead, stand mount, mobile skid, grease skid or trailer. The distribution manifold includes a plurality of manifold valves configured for coupling in fluid communication with the fracking valves, respectively, on the wellhead. A grease pump is disposed in fluid communication with the distribution manifold. Methods of lubricating fracking valves on a wellhead are also disclosed.

13 Claims, 14 Drawing Sheets

(56) References Cited

U.S. PATENT DOCUMENTS

| | | | |
|---|---|---|---|
| 2017/0038003 A1* | 2/2017 | Conley | F16N 7/385 |
| 2017/0146189 A1* | 5/2017 | Herman | F16N 13/22 |
| 2017/0275980 A1* | 9/2017 | Kajaria | E21B 43/26 |
| 2017/0276293 A1* | 9/2017 | McKim | E21B 34/02 |
| 2017/0336022 A1* | 11/2017 | Gouge | F16N 13/22 |
| 2017/0350223 A1* | 12/2017 | Guidry | F16L 27/12 |
| 2018/0112491 A1* | 4/2018 | Knott | E21B 34/02 |

* cited by examiner

GREASE DISTRIBUTION SYSTEMS AND METHODS

FIELD

Illustrative embodiments of the disclosure generally relate to systems and methods for lubricating fracking valves on a well fracking system used to form fractures in hydrocarbon-containing formations surrounding a subterranean hydrocarbon production well. More particularly, illustrative embodiments of the disclosure generally relate to grease distribution systems and methods which facilitate selective precisely-controlled greasing and lubrication of individual fracking valves on a well fracking system.

SUMMARY

Illustrative embodiments of the disclosure are generally directed to a grease distribution system for lubricating a plurality of fracking valves on a wellhead. The grease distribution system may include a distribution manifold configured for mounting on or adjacent to the wellhead, stand mount, mobile skid, grease skid or trailer. The distribution manifold includes a plurality of manifold valves configured for coupling in fluid communication with the fracking valves, respectively, on the wellhead. A grease pump is disposed in fluid communication with the distribution manifold.

Illustrative embodiments of the disclosure are further generally directed to methods of lubricating fracking valves on a wellhead, a stand mount, a mobile skid, a grease skid or a trailer. An illustrative embodiment of the methods includes mounting a distribution manifold of a grease distribution system on the wellhead, the stand mount, the mobile skid, the grease skid or the trailer, the distribution manifold having a plurality of manifold valves; selecting at least one of the fracking valves for lubrication; coupling at least one of the plurality of manifold valves of the grease distribution system to the at least one of the fracking valves; coupling a grease pump to the at least one of the plurality of manifold valves; opening the at least one of the plurality of manifold valves; and distributing grease from the grease pump through the at least one of the plurality of manifold valves to the at least one of the fracking valves by operation of the grease pump.

BRIEF DESCRIPTION OF THE DRAWINGS

Various non-limiting illustrative embodiments of the disclosure will now be described, by way of example, with reference to the accompanying drawings, wherein.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 3. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
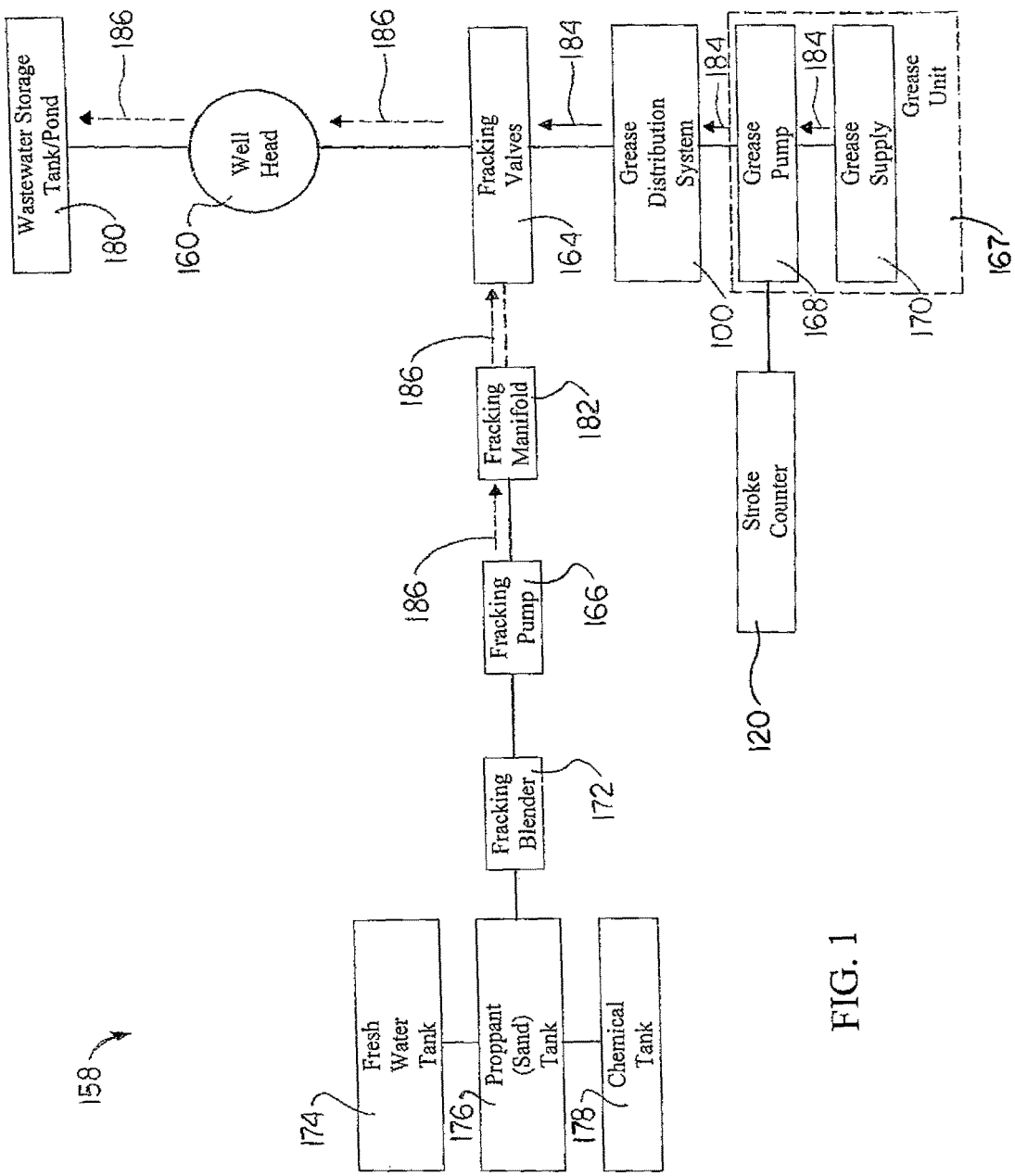
FIG. 1 is a schematic block diagram of an exemplary well fracking system in typical application of an illustrative embodiment of the grease distribution systems.
Figure 3:
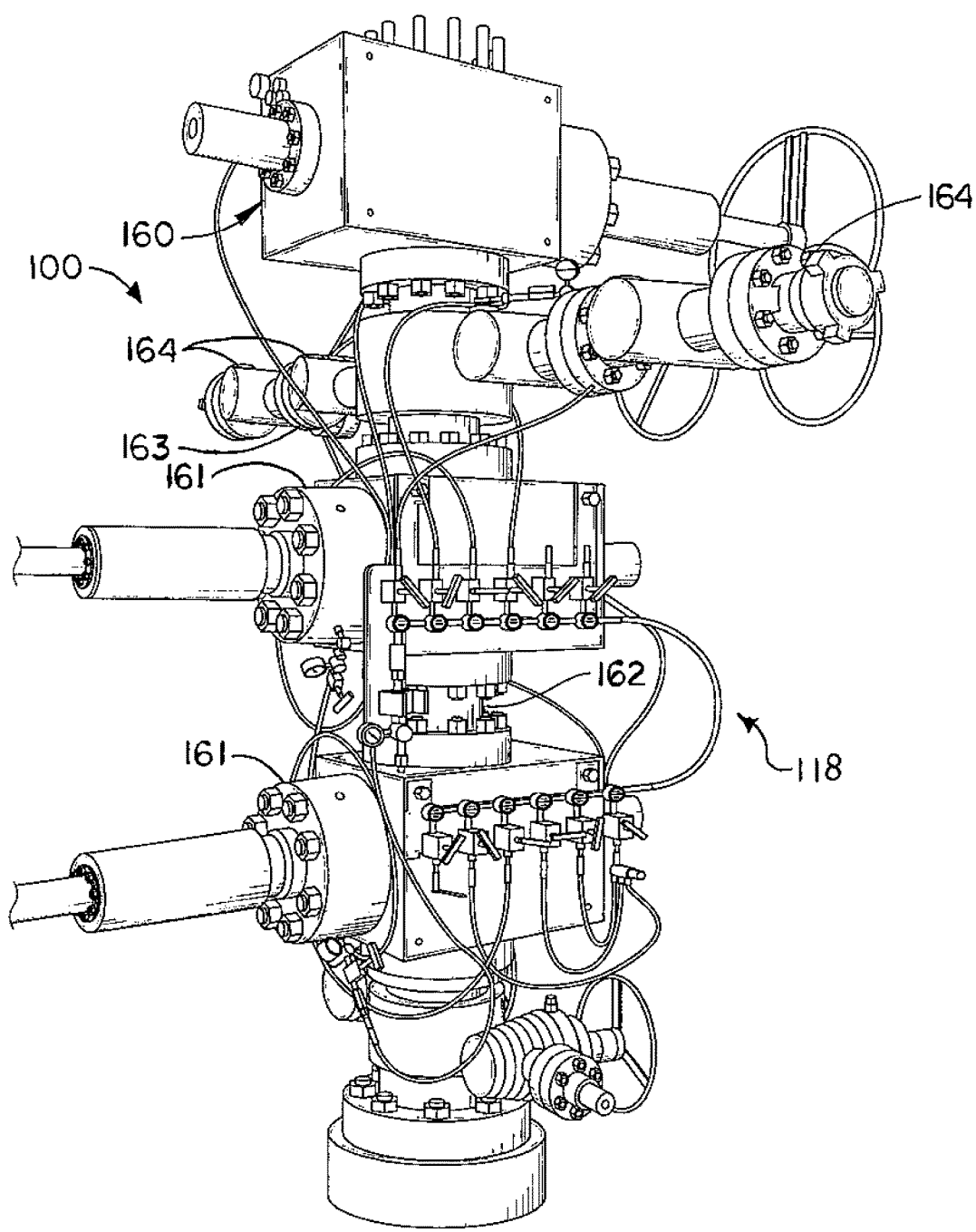
FIG. 3 is a front perspective view of an illustrative embodiment of the grease distribution systems, mounted on a well head in typical application of the system.
Figure 4:
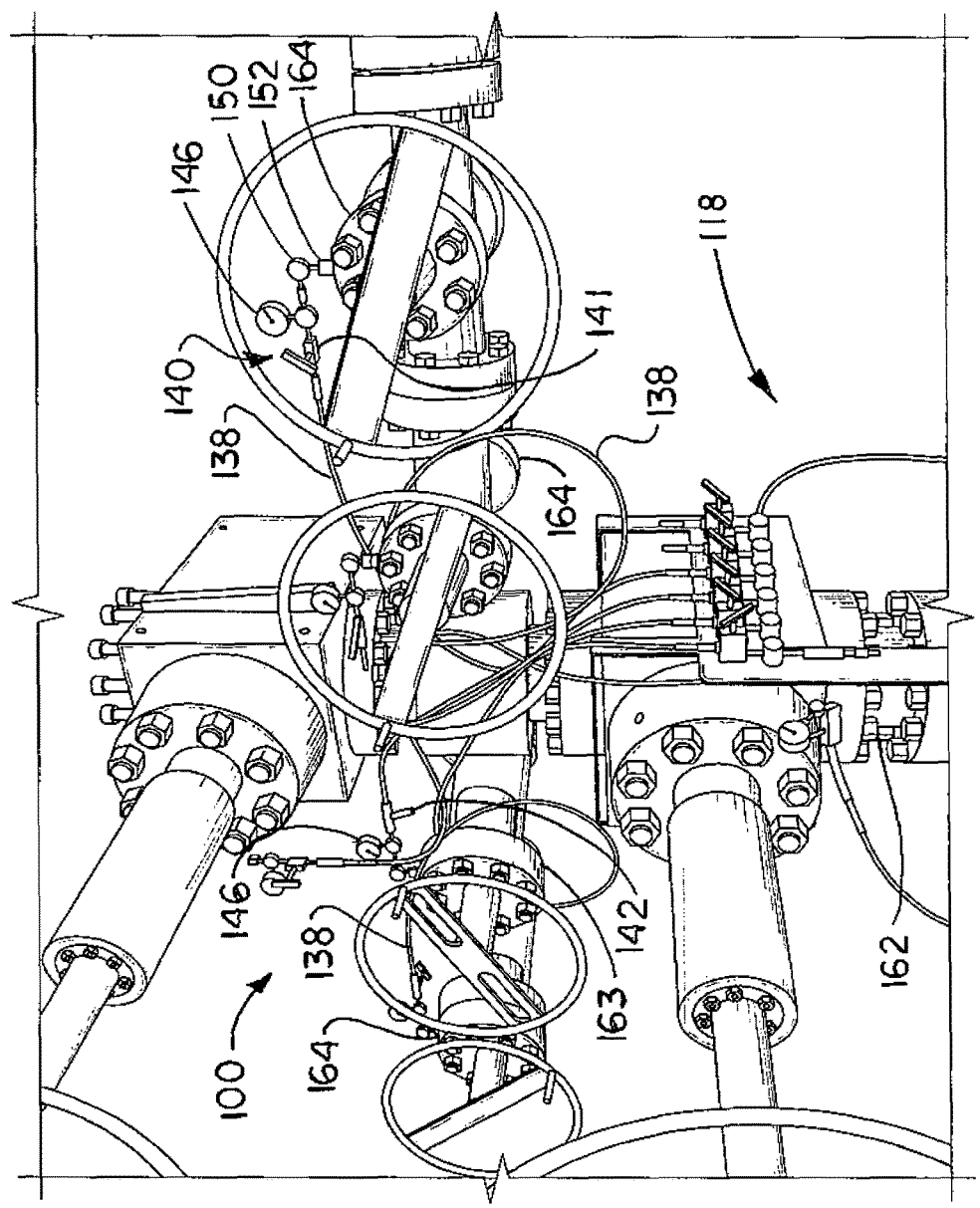
FIG. 4 is a perspective view of multiple fracking valves on the well head, with the grease distribution system connected to each fracking valve through a corresponding valve outlet conduit, safety valve and pressure gauge.
Figure 5:
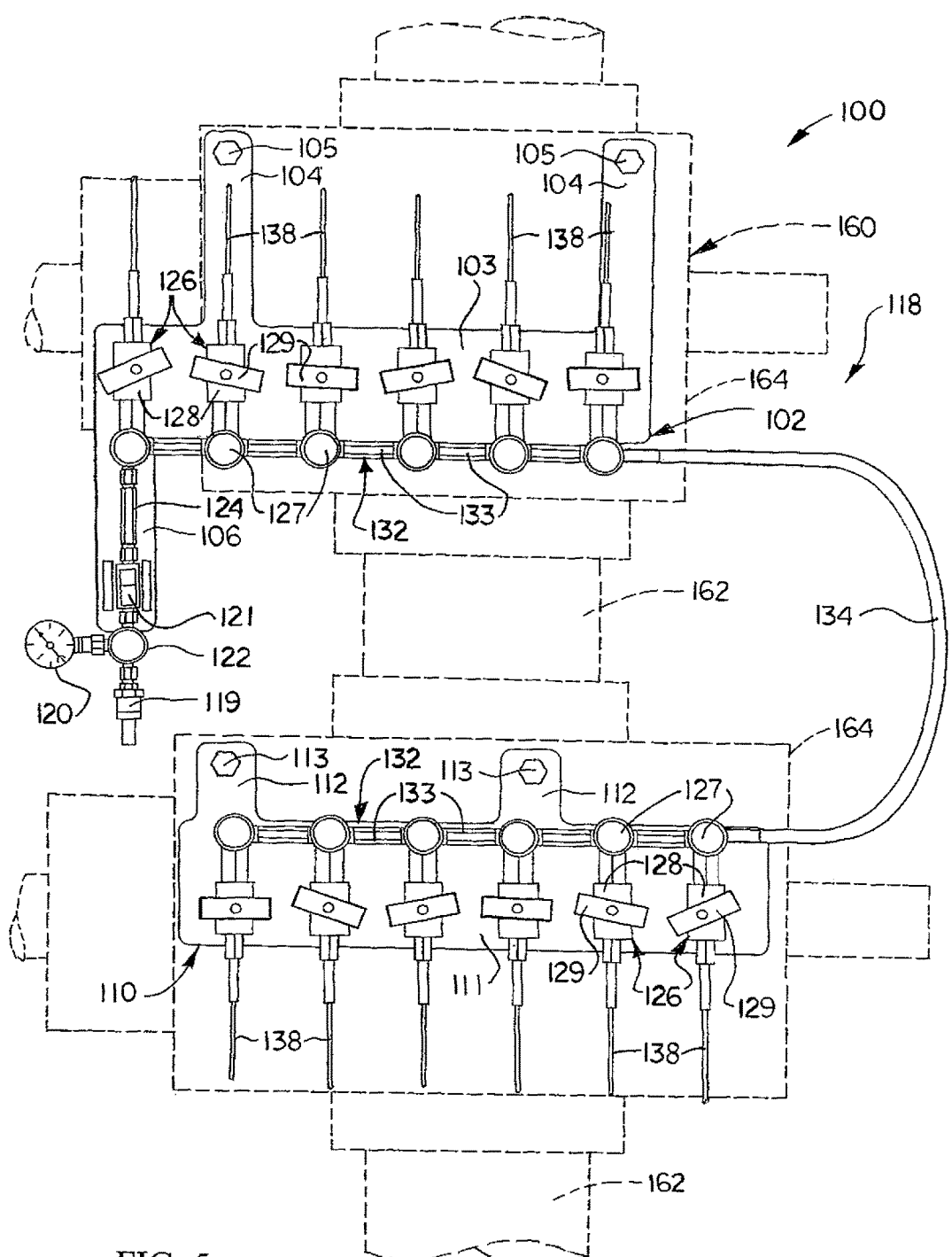
FIG. 5 is a front view of an illustrative embodiment of a typical distribution manifold of the grease distribution system, attached to the well head (illustrated in phantom)

Referring initially to FIGS. 1 and 3-5 of the drawings, a non-limiting illustrative embodiment of the grease distribution systems is generally indicated by reference numeral 100. As illustrated in FIG. 1 and will be hereinafter described, the grease distribution system 100 is suitable for periodically distributing and applying grease 184 in a precisely-controlled manner individually to one or simultaneously to more than one fracking valve 164 in a well fracking system 158. The fracking valves 164 may be part of an above-ground well head 160 which overlies and communicates with a subterranean hydrocarbon (oil or gas) production well (not illustrated). As illustrated in FIGS. 3-5, a tubing string 162 may extend into the subterranean hydrocarbon production well. The wellhead 160 may include multiple fracking valves 164 which are disposed in fluid communication with the above-ground segment of the tubing string 162. As illustrated in FIGS. 3 and 4, in some fracking operations, a selected number of additional fracking valves 164 may be provided on a horizontal injection conduit 163 which communicates with the tubing string 162.

In typical operation, the well fracking system 158 induces fractures in hydrocarbon-containing formations which surround the subterranean hydrocarbon production well. Accordingly, a typically hydraulic fracking pump 166 may be coupled in fluid communication with the fracking valves 164 typically through a fracking manifold 182. A fracking blender 172 may be coupled in fluid communication with the fracking pump 166. A fresh water tank 174, a proppant (sand) tank 176 and a chemical tank 178 may be coupled in fluid communication with the fracking blender 172. The fresh water tank 174 contains a supply of fresh water. The sand tank 176 contains a supply of particulate material such as grains of sand or ceramic. The chemical tank 178 contains a supply of chemical additives which may include acids, sodium chloride, poly acrylamide. ethylene glycol, sodium carbonate, potassium carbonate, guar gum, citric acid, isopropanol or combinations thereof.

The fracking blender 172 receives and mixes the fresh water, the sand and the chemical additives from the fresh water tank 174, the sand tank 176 and the chemical tank 178, respectively, forming fracking fluid 186. The fracking pump 166 pumps the fracking fluid 186 from the fracking blender 172 through the fracking manifold 182 and the open fracking valves 164, respectively, and at high pressure into the subterranean hydrocarbon production well through the well head 160. The fracking fluid 186 may be pumped into the subterranean hydrocarbon production well at a rate which is sufficient to increase downhole pressure above the fracture gradient (pressure gradient) of the rock strata in the hydrocarbon formations surrounding the wellbore. The pressure of the fracking fluid 186 creates small fractures in the hydrocarbon formations, increasing permeability of the formations to the hydrocarbons and increasing subsequent production of the hydrocarbons from the hydrocarbon production well typically through a Christmas tree (not illustrated) which is subsequently assembled over the hydrocarbon production well in place of the wellhead 160. After completion of the fracking operation, the fracking fluid 186 may be pumped from the hydrocarbon production well through the wellhead 160 and discharged into a wastewater storage tank or pond 180.

Between fracking operations, it may be advantageous to periodically apply the grease 184 to the fracking valves 164 to lubricate and ensure optimum operation and longevity of the fracking system 158. Accordingly, in some applications, the fracking manifold 182 may remain coupled to the fracking valves 164. After lubrication of the fracking valves 164 is completed, the fracking operations may resume.

As further illustrated in FIG. 1, preparatory to lubrication of the fracking valves 164, a grease pump 168 may be coupled in fluid communication with the grease distribution system 100. A grease supply 170 may be coupled in fluid communication with the grease pump 168. In some embodiments, the grease pump 168 and the grease supply 170 may be provided together as a grease unit 167. Accordingly, responsive to operation of the grease pump 168, the grease distribution system 100 distributes a supply of grease 184 to a selected one or more of the fracking valves 164 in a precisely-controlled and monitored manner for optimum lubrication of the fracking valve or valves 164 and operation of the fracking system 158, as will be hereinafter further described.

Referring next to FIGS. 2-7 of the drawings, the grease distribution system 100 may include a distribution manifold 118. A grease meter 154 may communicate with the distribution manifold 118. A distribution manifold inlet coupling 119 may communicate with the grease meter 154. Preparatory to operation of the grease distribution system 100, which will be hereinafter described, the grease pump 168 (FIG. 1) may be coupled to the distribution manifold inlet coupling 119.

Figure 2:
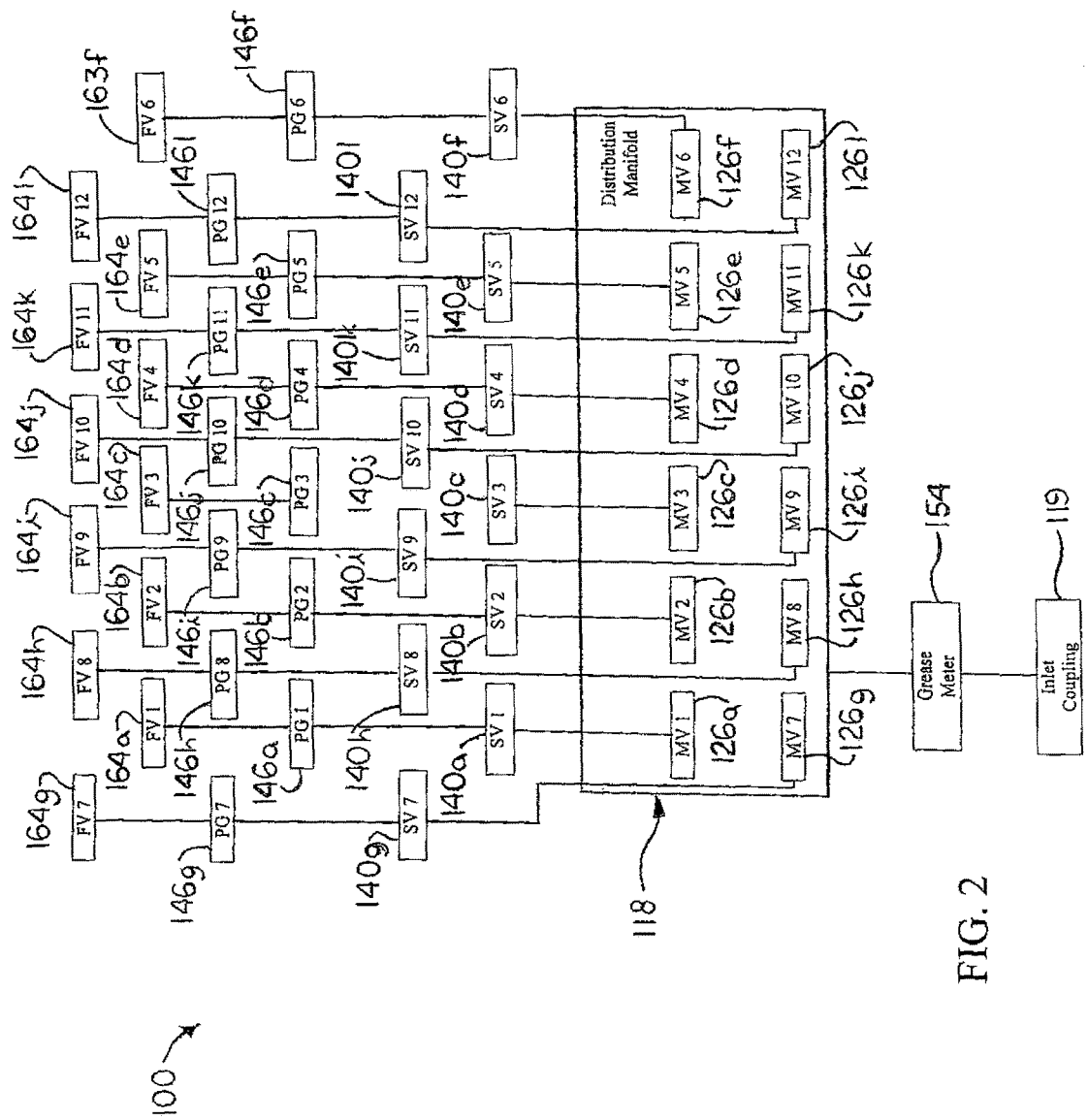
FIG. 2 is a schematic block diagram of an illustrative embodiment of the grease distribution systems.

The distribution manifold 118 may include multiple manifold valves 126, shown in FIG. 2 as manifold valves 126a-126l, respectively. The manifold valves 126 in the distribution manifold 118 may correspond in number to the respective fracking valves 164 which are to be lubricated. In the non-limiting example illustrated in FIG. 2, twelve fracking valves 164, indicated by the respective reference numerals 163a-163l, are configured for lubrication. However, it will be recognized and understood that the grease distribution system 100 may be adapted to grease any number of fracking valves 164. The distribution manifold 118 of the grease distribution system 100 may be mounted on the wellhead 160 typically in a manner which will be hereinafter described.

As further illustrated in FIG. 2, a safety valve 140, indicated by reference numerals 140a-140l, respectively, may communicate with each manifold valve 126. Grease pressure gauges 146a-146l, respectively, may communicate with the respective safety valves 140a-140l. The grease pressure gauges 146a-146l may be coupled in fluid communication with the respective fracking valves 164a-164l.

The distribution manifold 118 of the grease distribution system 100 may be mounted on the wellhead 160 using any suitable technique which is known by those skilled in the art. As illustrated in FIGS. 3-5, in some embodiments, the distribution manifold 118 may include an upper valve mount plate 102 and a lower valve mount plate 110 which are mounted on the well head 160 according to the knowledge of those skilled in the art. In some embodiments, the upper valve mount plate 102 may include a generally elongated main plate portion 103. A pair of elongated, parallel, spaced-apart plate mount flanges 104 may extend from the main plate portion 103 in perpendicular relationship to a longitudinal axis of the main plate portion 103. Plate mount fasteners 105 may be extended through respective fastener openings (not illustrated) in the plate mount flanges 104 and threaded into registering fastener openings (not illustrated) in the well head 160. An elongated inlet coupling mount flange 106 may extend from the main plate portion 103 in perpendicular relationship to the longitudinal axis of the main plate portion 103.

The lower valve mount plate 110 may include a generally elongated main plate portion 111. A pair of parallel, spaced-apart plate mount flanges 112 may extend from the main plate portion 111 in perpendicular relationship to a longitudinal axis of the main plate portion 111. The plate mount flanges 112 may be attached to the well head 160 using a respective pair of plate mount fasteners 113. A selected number of the manifold valves 126 of the distribution manifold 118 may be attached to the upper valve mount plate 102 and the lower valve mount plate 110 using brackets, mechanical fasteners and/or other suitable attachment technique known by those skilled in the art.

As further illustrated in FIG. 5, the distribution manifold 118 may include the distribution manifold inlet coupling 119. The distribution manifold inlet coupling 119 may facilitate coupling of the grease pump 168 (FIG. 1) to the distribution manifold 118. A stroke counter 120 which counts the strokes of the grease pump 168 may be coupled in fluid communication with the distribution manifold inlet coupling 119 such as through a gauge coupling 122. A grease meter 121 may communicate with the gauge coupling 122. Accordingly, the stroke counter 120 may count the strokes of the grease pump 168 by measuring the intermittent pressure of the grease 184 corresponding to the strokes of the grease pump 168 as the grease 184 flows through the distribution manifold 118, whereas the grease meter 121 may indicate the quantity or volume of the grease 184 which flows into the distribution manifold 118. An inlet conduit 124 may be disposed in fluid communication with the grease meter 121. The distribution manifold inlet coupling 119, the stroke counter 120, the grease meter 121 and the gauge coupling 122 may be mounted on the inlet coupling mount flange 106 of the upper valve mount plate 102 using clips, brackets, ties, mechanical fasteners and/or any other techniques (not illustrated) known by those skilled in the art.

The multiple manifold valves 126 of the distribution manifold 118 are disposed in fluid communication with the inlet conduit 124 of the distribution manifold 118. A main valve conduit 132 may be disposed in fluid communication with the inlet conduit 124. The manifold valves 126 may be disposed in fluid communication with the main valve conduit 132.

In some embodiments, each manifold valve 126 may include a needle valve known by those skilled in the art. Each manifold valve 126 may include a manifold valve coupling 127 which is provided in the main valve conduit 132. A manifold valve body 128 may communicate with the manifold valve coupling 127. A manifold valve handle 129 may be provided on the manifold valve body 128. The manifold valve handle 129 facilitates selective opening and closing of the corresponding manifold valve 126 by rotation, typically in the conventional manner. The manifold valves 126 may be mounted on the main plate portion 103 of the upper valve mount plate 102 using clips, brackets, ties, mechanical fasteners and/or any other suitable technique which is known by those skilled in the art. Any desired number of the manifold valves 126 may be connected to the main valve conduit 132 and mounted on the upper valve mount plate 102 depending upon the number of fracking valves 164 which are to be lubricated in application of the grease distribution system 100. Accordingly, the main valve conduit 132 may include multiple valve conduit segments 133. The manifold valve couplings 127 of the respective manifold valves 126 may be threaded and/or otherwise coupled to the valve conduit segments 133 depending on the number of fracking valves 164 which are to be lubricated in operation of the grease distribution system 100.

As further illustrated in FIG. 5, in some embodiments, additional manifold valves 126 may be mounted on the main plate portion 111 of the lower valve mount plate 110. Each manifold valve 126 mounted on the lower valve mount plate 110 may have a design which is the same as or similar to each manifold valve 126 which is mounted on the upper valve mount plate 102. A connecting conduit 134 may establish fluid communication between the main valve conduit 132 of the manifold valves 126 on the upper valve mount plate 102 with the main valve conduit 132 of the manifold valves 126 on the lower valve mount plate 110.

Figure 6:
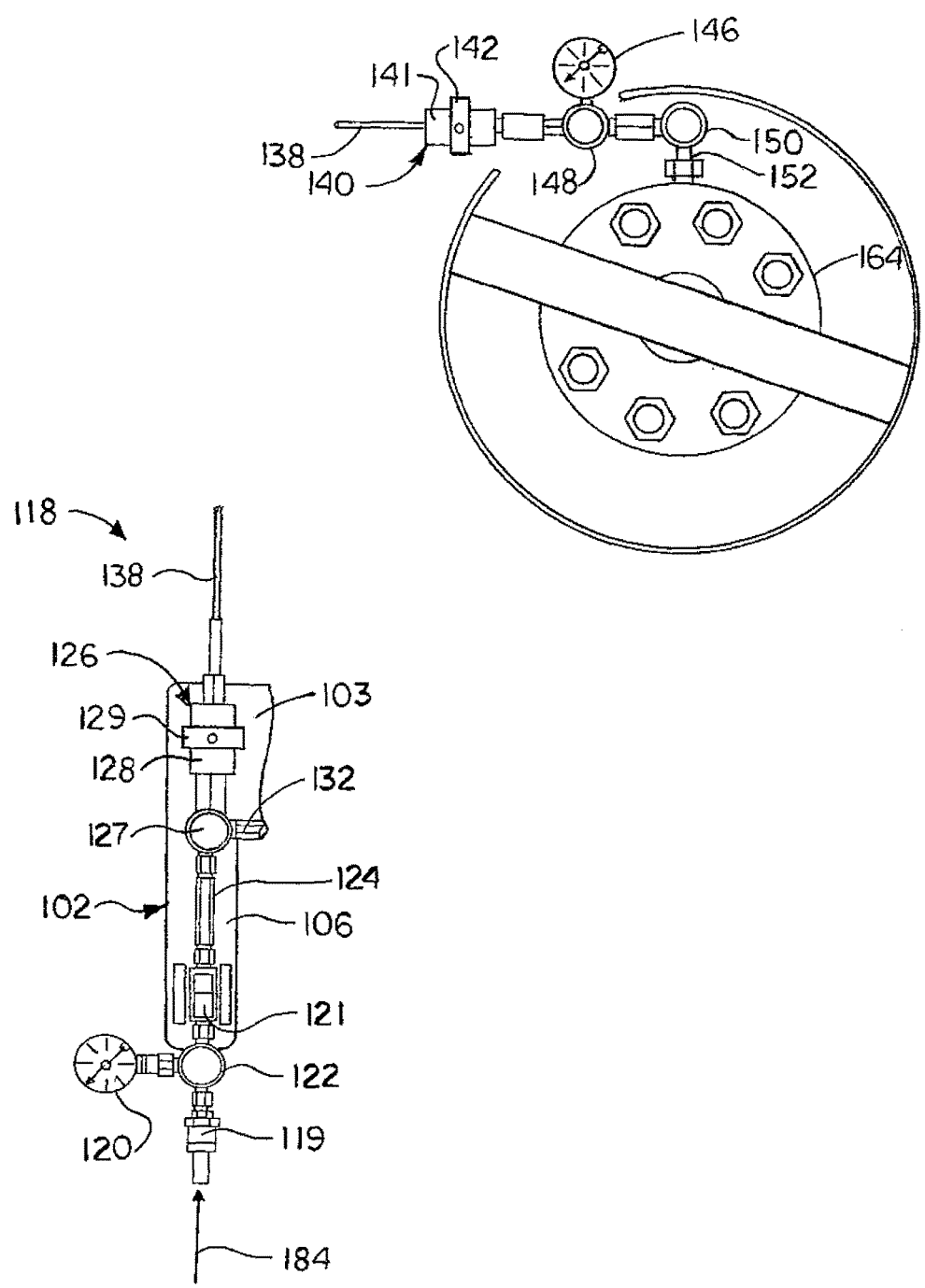
FIG. 6 is a front view of a distribution manifold inlet coupling, a grease meter, an optional stroke counter and a manifold valve mounted on a valve mount plate of the distribution manifold, with the manifold valve connected to a fracking valve through a valve outlet conduit (illustrated in section), a safety valve and a grease pressure gauge, more particularly illustrating the manifold valve and the safety valve in closed positions.
Figure 7:
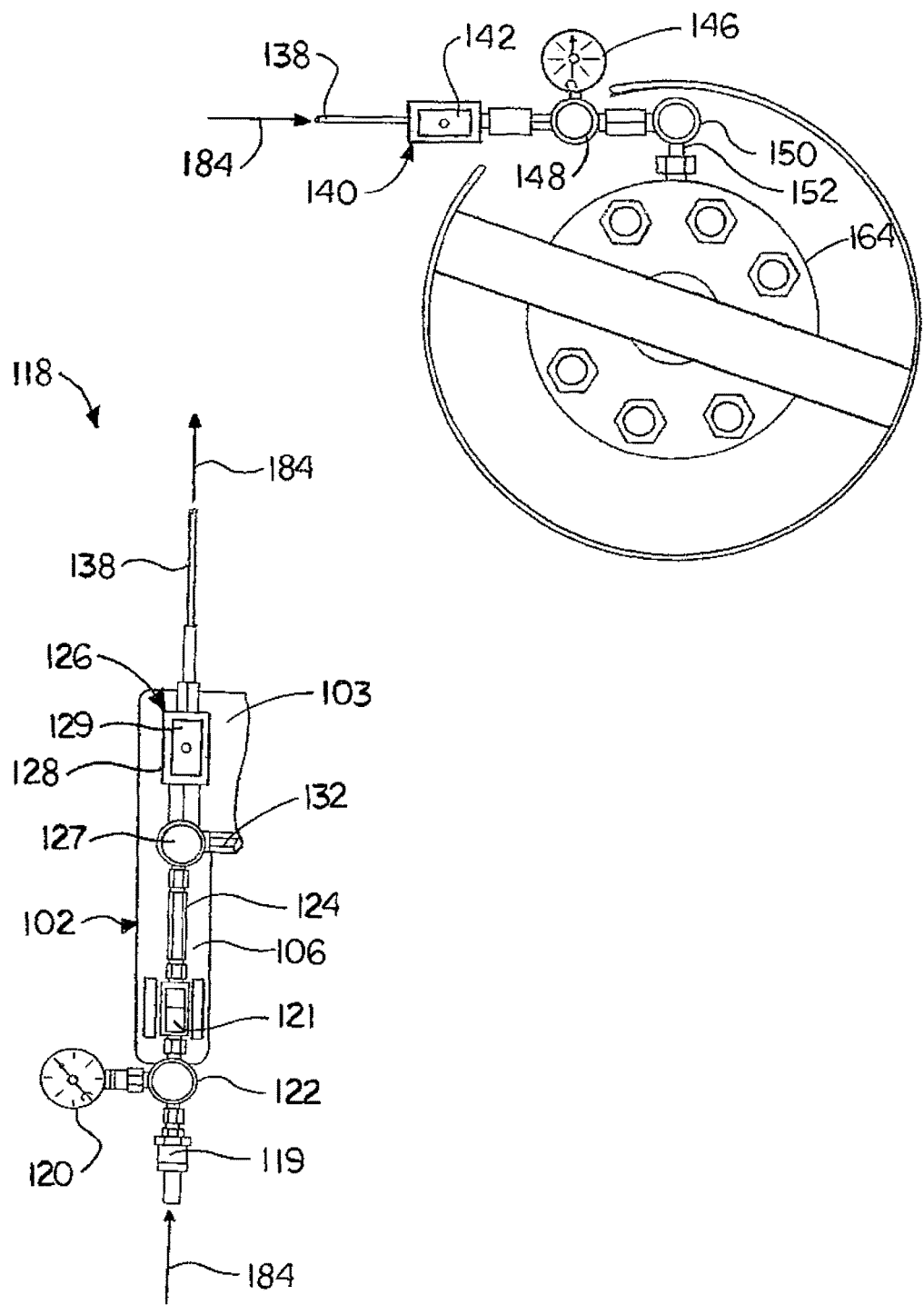
FIG. 7 is a front view of the distribution manifold inlet coupling, the grease meter, the optional stroke counter and the manifold valve mounted on the valve mount plate of the distribution manifold, with the manifold valve connected to the fracking valve through the valve outlet conduit (illustrated in section), the safety valve and the grease pressure gauge, more particularly illustrating the manifold valve and the safety valve in open positions.

As illustrated in FIGS. 6 and 7, a valve outlet conduit 138 may be disposed in fluid communication with the manifold valve body 128 of each corresponding manifold valve 126 in the distribution manifold 118. Each safety valve 140 may be disposed in fluid communication with each corresponding valve outlet conduit 138. In some embodiments, each safety valve 140 may include a needle valve having a safety valve body 141 and a rotatable safety valve handle 142 which is provided on the safety valve body 141 and facilitates selective opening and closing of the safety valve 140. Each grease pressure gauge 146 may be disposed in fluid communication with the corresponding safety valve 140 typically through a gauge coupling 148. A grease fitting 152 may be disposed in fluid communication with each corresponding gauge coupling 148 typically through a conduit coupling 150. The fracking valve coupling 152 is coupled in fluid communication with the corresponding fracking valve 164 according to the knowledge of those skilled in the art. Accordingly, as illustrated in FIG. 6, the safety valve 140 may be closed in the event that the grease fitting 152 fails. During operation of the grease distribution system 100, the safety valve 140 remains open, as illustrated in FIG. 7.

The grease distribution system 100 may be coupled to the fracking valves 164 typically via the grease fittings 152 (FIGS. 6 and 7). Between fracking operations, it may be desirable to lubricate one or more of the fracking valves 164 on the wellhead 160. Accordingly, in some applications, the fracking manifold 182 may remain coupled to the fracking valves 164 during lubrication. In the event that lubrication of any of the fracking valves 164 is deemed necessary, a selected one or more of the manifold valves 126 which corresponds to the fracking valve or valves 164 to be lubricated may be opened typically by rotation of the corresponding manifold valve handle 129. The safety valve 140 corresponding to the fracking valve or valves 164 to be lubricated may remain opened throughout lubrication typically by rotation of the corresponding safety valve handle 142. Responsive to subsequent operation of the grease pump 168 (FIG. 1), grease 184 is distributed from the grease source 170 and through the open manifold valve 126 of the distribution manifold 118. The stroke counter 120 may measure the pressure of the grease 184 as it flows through the inlet conduit 124 of the distribution manifold 118 and indicate the strokes of the grease pump 168. Likewise, the grease meter 121 may indicate the quantity or volume of grease 184 which flows through the inlet conduit 124. The grease 184 flows from the inlet conduit 124 through the main valve conduit 132 and into the open manifold valve or valves 126. As illustrated in FIG. 7, the grease 184 flows through the open manifold valve 126 of the distribution manifold 118 and through the valve outlet conduit 138, the open safety valve 140 and the grease fitting 152 and into the fracking valve 164, lubricating the fracking valve 164. The grease pressure gauge 146 may indicate the pressure of the grease 184 as it flows through the safety valve 140 and the grease fitting 152 into the fracking valve 164. The safety valve handle 142 can be rotationally adjusted to select the quantity, flow rate and pressure of the grease 184 which flows through the safety valve 140 into the fracking valve 164.

Upon completion of the greasing operation, the manifold valve 126 of the distribution manifold 118 and the safety valve 140 may be closed and operation of the grease pump 168 terminated. In the event that any of the other fracking valves 164 requires lubrication, the manifold valve 126 and safety valve 140 which correspond to that particular fracking valve 164 may be opened and the fracking valve 164 lubricated in the foregoing manner. In some applications, when lubrication of the fracking valve or valves 164 is completed, the grease distribution system 100 may remain coupled to the fracking valves 164 during the fracking operations.

It will be appreciated by those skilled in the art that the grease distribution system 100 facilitates greasing of fracking valves on a wellhead on an individual and precisely-controlled basis. Moreover, the grease distribution system occupies little or no footprint in the area of the wellhead.

Figure 8:
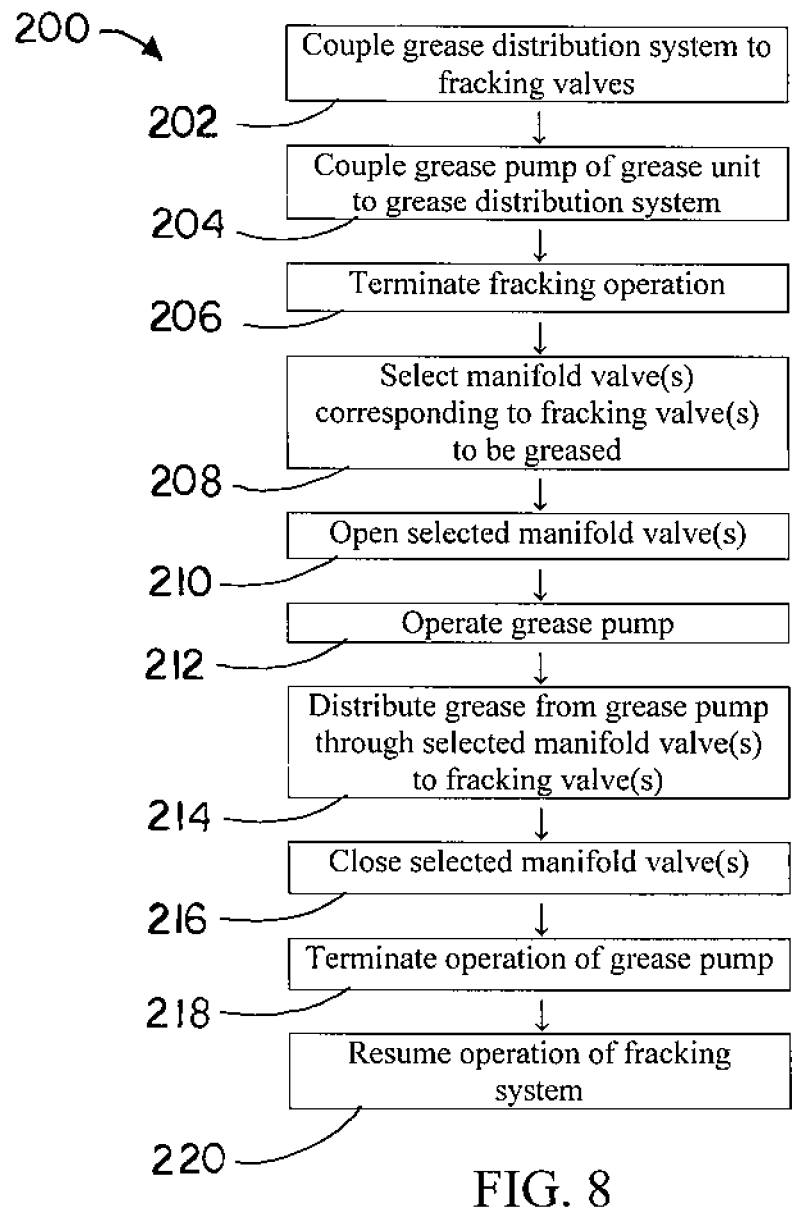
FIG. 8 is a flow diagram of an illustrative embodiment of the grease distribution methods.

Referring next to FIG. 8 of the drawings, a flow diagram of an illustrative embodiment of the grease distribution methods is generally indicated by reference numeral 200. At Step 202, a grease distribution system is coupled to fracking valves. The grease distribution system includes a distribution manifold having a plurality of manifold valves which are coupled to the respective fracking valves. In some applications, the distribution manifold may be mounted on the wellhead according to the knowledge of those skilled in the art. In other applications, the distribution manifold may be supported on a stand which may placed adjacent to the wellhead. In still other applications, the distribution manifold may be supported on a mobile skid which may be towed or otherwise maneuvered adjacent to the wellhead. In yet other applications, the distribution manifold and the grease unit may be supported on a mobile grease skid, which may be towed or otherwise maneuvered adjacent to the wellhead. In the various applications, the distribution manifold may be positioned immediately adjacent to the wellhead, such as in the "pressure zone" of the wellhead, or remotely located relative to the wellhead. As used herein, "pressure zone" refers to an area surrounding the wellhead in which personnel may be subject to an increased health and safety risk during fracking operations.

At Step 204, a grease pump of a grease unit may be coupled to the grease distribution system. At Step 206, a fracking operation is terminated. At Step 208, one or more manifold valves which correspond to the fracking valve or valves to be lubricated are selected. At Step 210, the manifold valve(s) are opened. At Step 212, a grease pump is operated. At Step 214, grease is distributed from the grease pump through manifold valve(s) to the fracking valve(s). At Step 216, the manifold valve(s) are closed. At Step 218, operation of the grease pump may be terminated. The grease distribution system may remain coupled to the fracking valves. At Step 220, operation of the fracking system may be resumed.

Figure 9:
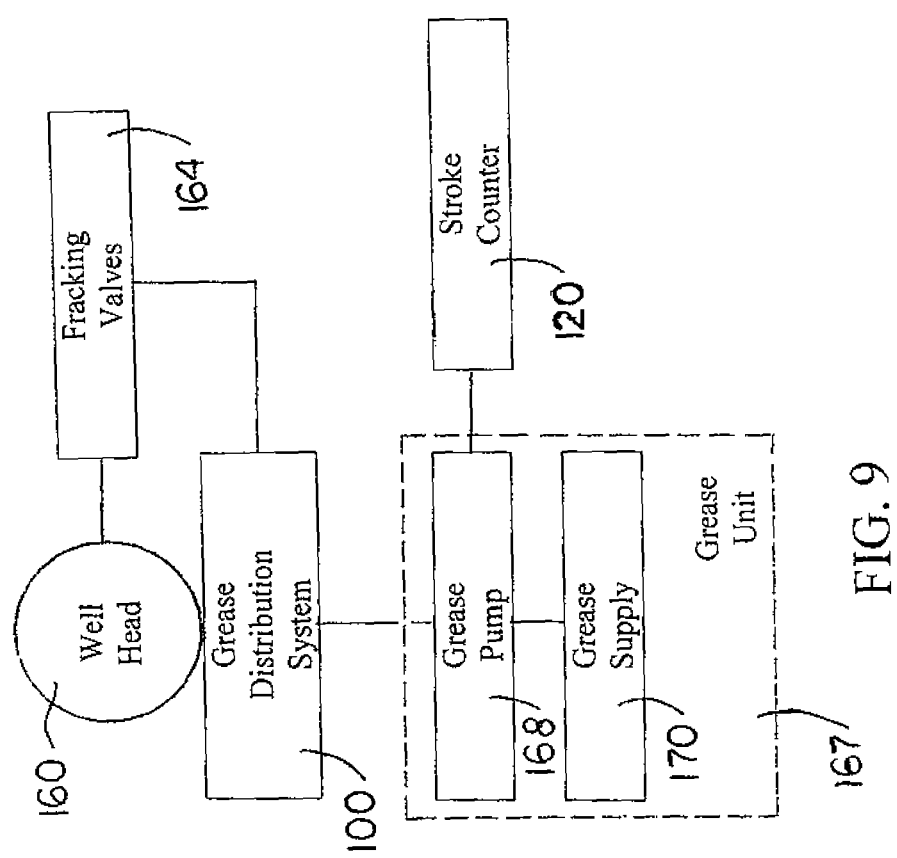
FIG. 9 is a block diagram illustrating exemplary mounting of the grease distribution system on the wellhead.

Referring next to FIG. 9 of the drawings, in some embodiments, the distribution manifold 118 of the grease distribution system 100 may be mounted directly on the wellhead 160, as illustrated in FIG. 9. In some embodiments, the distribution manifold 118 may be attached to the wellhead 160 via the upper valve mount plate 102 and the lower valve mount plate 110, as was heretofore described with respect to FIG. 5. In other embodiments, the distribution manifold 118 may be attached to the wellhead 160 using brackets, mechanical fasteners and/or any other suitable technique known by those skilled in the art.

Figure 10:
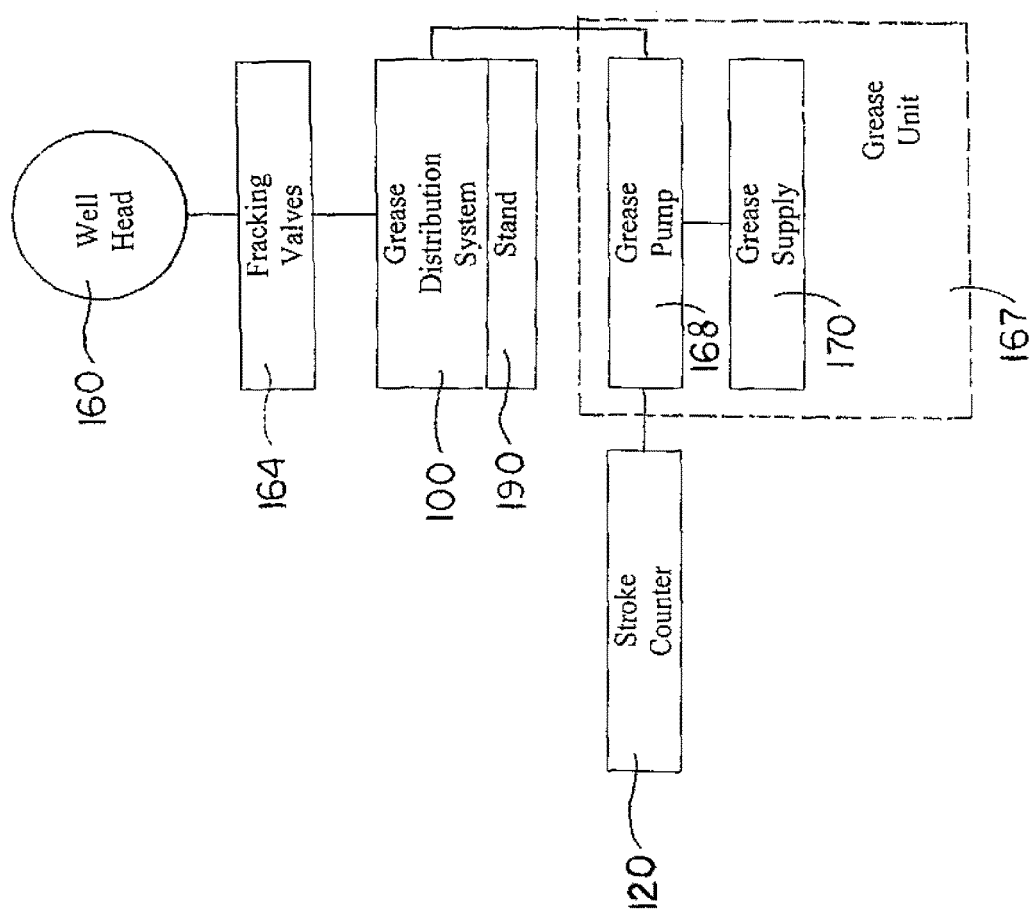
FIG. 10 is a block diagram illustrating exemplary mounting of the grease distribution on a stand.
Figure 14:
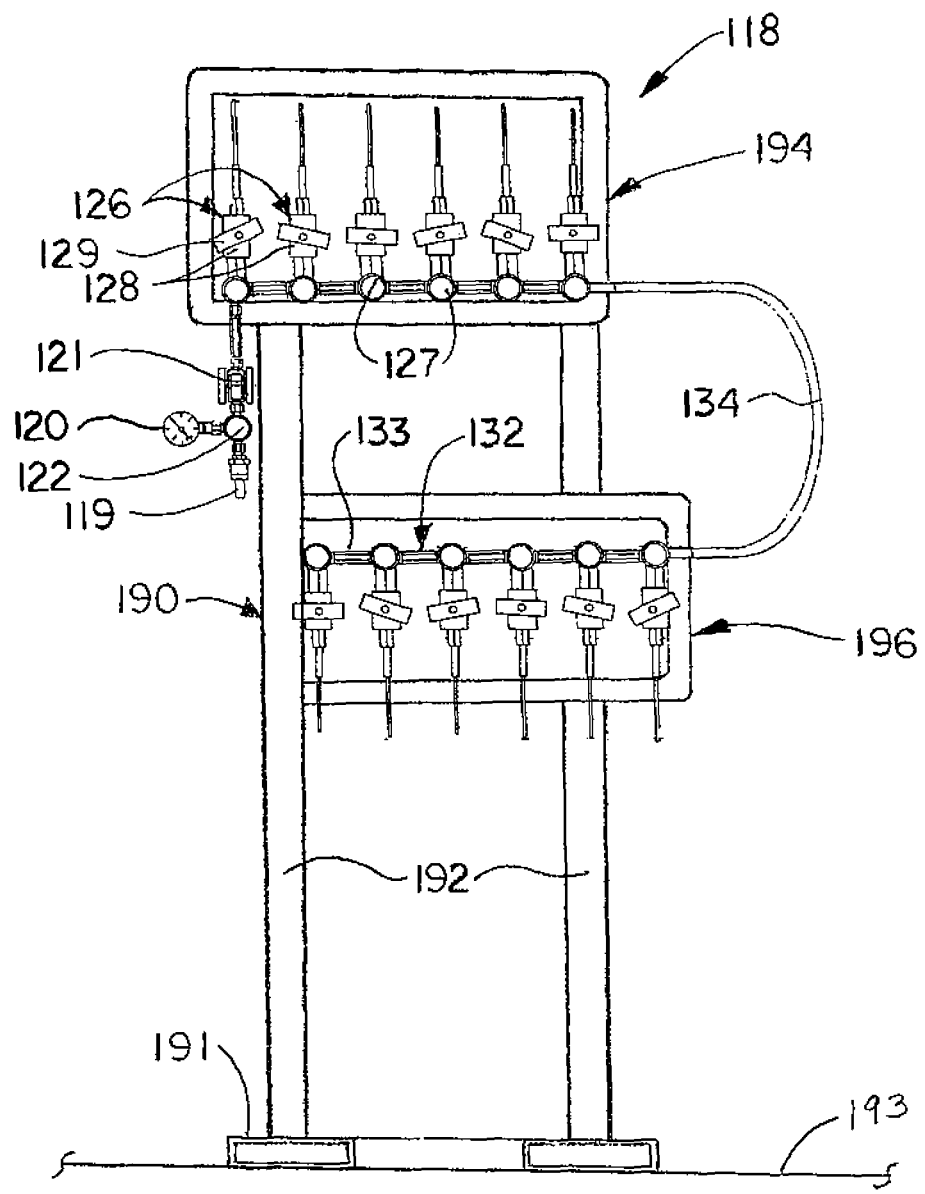
FIG. 14 is a front view of a typical stand and the manifold of the grease distribution system mounted on the stand.

Referring next to FIGS. 10 and 14, in some embodiments, the distribution manifold 118 of the grease distribution system 100 may be mounted on a self-supporting stand 190. In some embodiments, the stand 190 may include a stand base 191 which rests flat on a supporting surface 193. A pair of upward-standing stand legs 192 may extend from the stand base 191. An upper valve mount plate 194 and a lower valve mount plate 196 may be mounted on the stand legs 192. The distribution manifold 118 may be mounted on the upper valve mount plate 194 and the lower valve mount plate 196. Accordingly, stand 190, with the grease distribution system 100 mounted thereon, can be placed at or adjacent to the wellhead 160. The grease distribution system 198 can be coupled to the fracking valves 164 and operated typically as was heretofore described. After lubrication of the fracking valves 164 is completed, the grease distribution system 198 can remain coupled to the fracking valves 164 during fracking operations, or may alternatively be uncoupled from the fracking valves 164 prior to resumption of fracking operations.

Figure 11:
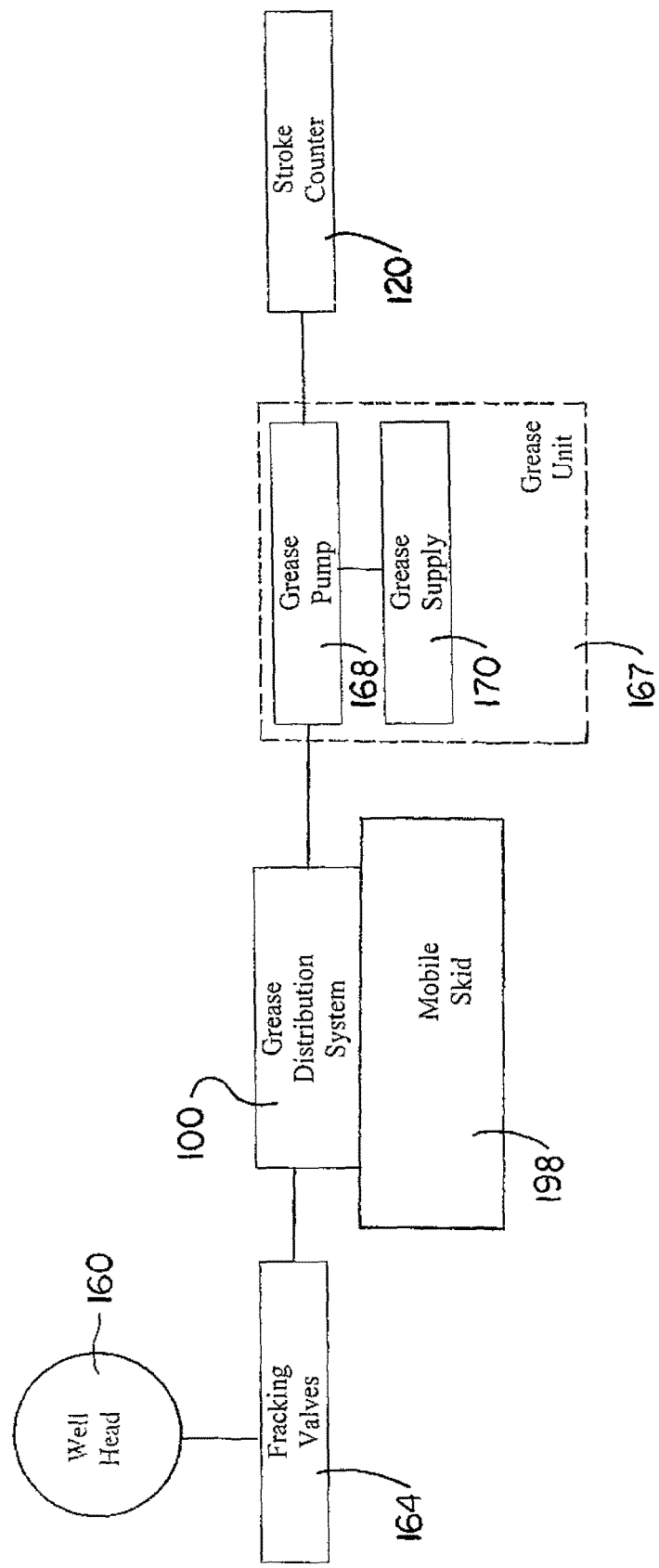
FIG. 11 is a block diagram illustrating exemplary mounting of the grease distribution system on a mobile skid.

As illustrated in FIG. 11, in some embodiments, the distribution manifold 118 of the grease distribution system 100 may be mounted on a mobile skid 198. The mobile skid 198 may include a skid platform (not illustrated) and multiple skid runners (not illustrated) provided on the skid platform to render the mobile skid 198 mobile on a flat surface. Accordingly, the mobile skid 198, with the grease distribution system 100 mounted thereon, can be towed or otherwise maneuvered into place at or adjacent to the wellhead 160. The grease distribution system 198 can be coupled to the fracking valves 164 and operated typically as was heretofore described. After lubrication of the fracking valves 164 is completed, the grease distribution system 198 can remain coupled to the fracking valves 164 during fracking operations, or may alternatively be uncoupled from the fracking valves 164 prior to resumption of fracking operations.

Figure 12:
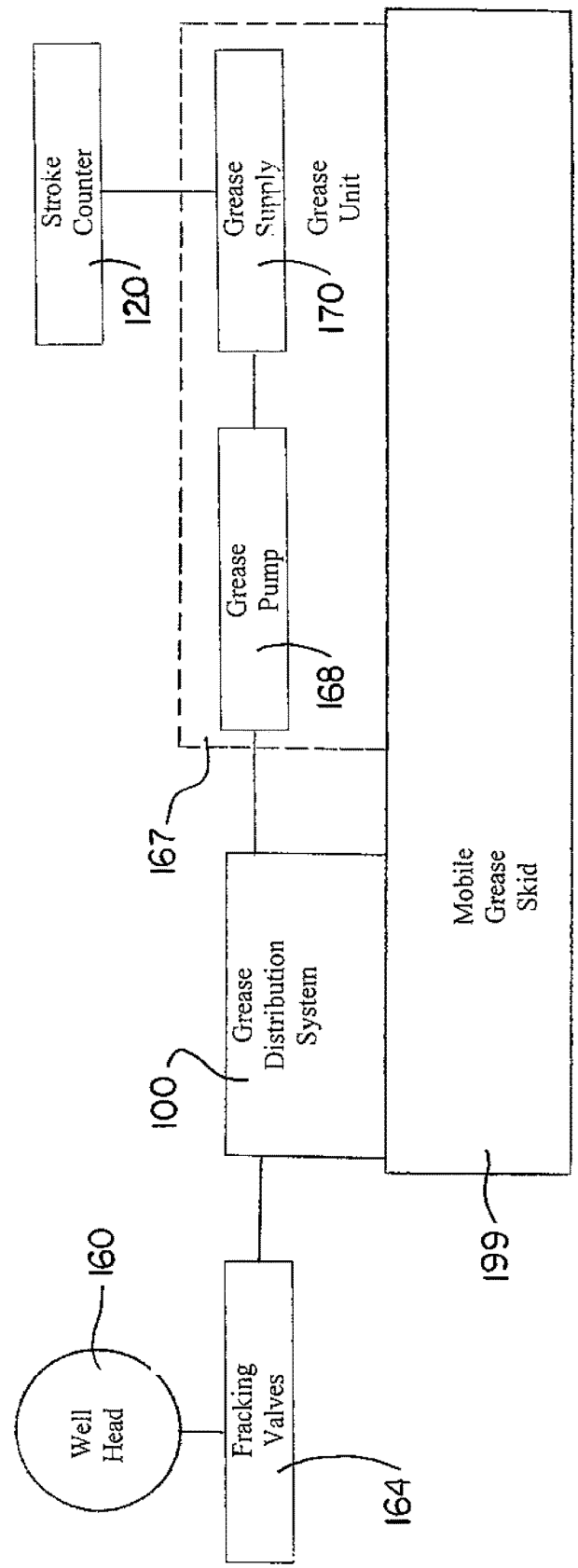
FIG. 12 is a block diagram illustrating exemplary mounting of the grease distribution system on a mobile grease skid.

As illustrated in FIG. 12, in some embodiments, both the distribution manifold 118 of the grease distribution system 100 and the grease unit 167 may be mounted on a mobile grease skid 199. The mobile grease skid 199 may include a grease skid platform (not illustrated) and multiple grease skid runners (not illustrated) provided on the grease skid platform to render the mobile grease skid 199 mobile on a flat surface. Accordingly, the mobile grease skid 199, with the grease distribution system 100 and the grease unit 167 mounted thereon, can be towed or otherwise maneuvered into place at or adjacent to the wellhead 160. The grease distribution system 198 can be coupled to the fracking valves 164 and operated typically as was heretofore described. After lubrication of the fracking valves 164 is completed, the grease distribution system 198 can remain coupled to the fracking valves 164 during fracking operations, or may alternatively be uncoupled from the fracking valves 164 prior to resumption of fracking operations.

Figure 13:
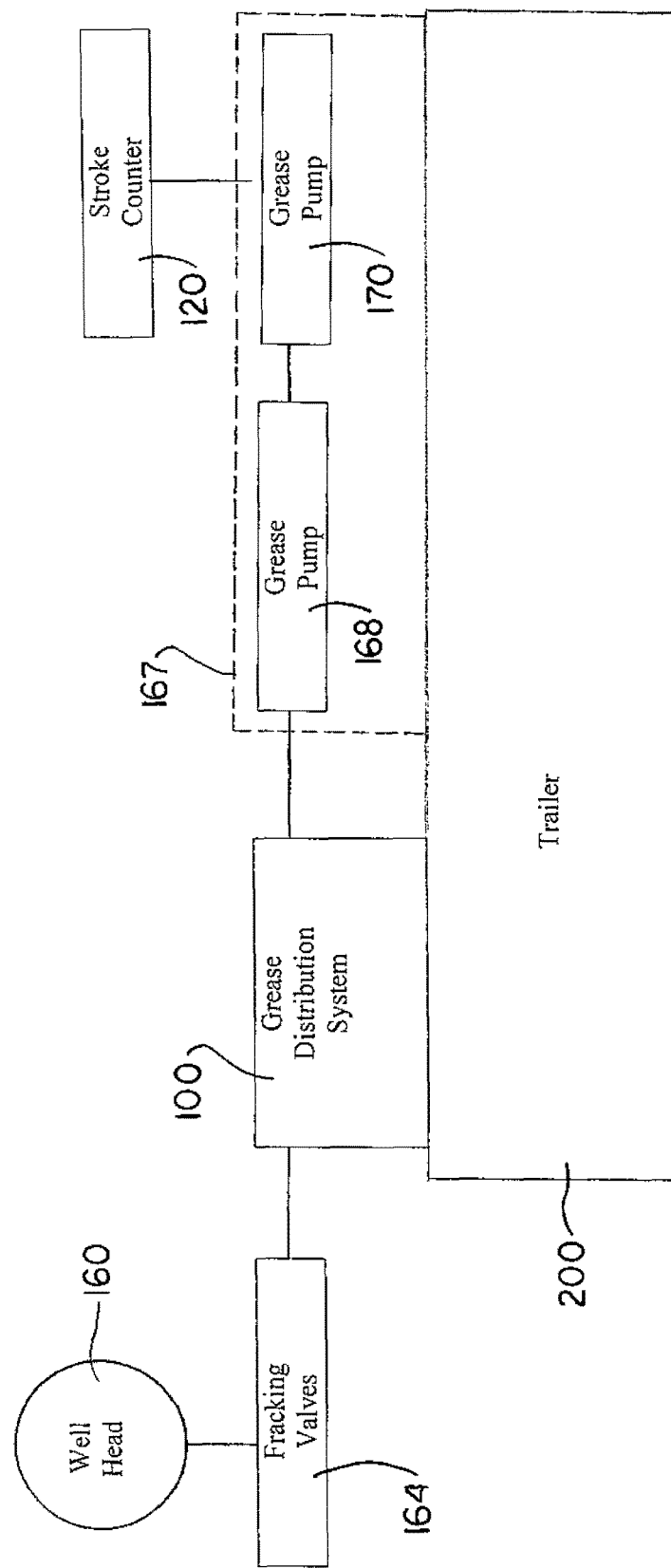
FIG. 13 is a block diagram illustrating exemplary mounting of the grease distribution system on a trailer.

As illustrated in FIG. 13, in some embodiments, both the distribution manifold 118 of the grease distribution system 100 and the grease unit 167 may be mounted on a trailer 200. The trailer 200 may include a trailer platform (not illustrated) and multiple trailer wheels (not illustrated) provided on the trailer platform to render the trailer 200 mobile on a flat surface. Accordingly, the trailer 200, with the grease distribution system 100 and the grease unit 167 mounted thereon, can be towed or otherwise maneuvered into place at or adjacent to the wellhead 160. The grease distribution system 198 can be coupled to the fracking valves 164 and operated typically as was heretofore described. After lubrication of the fracking valves 164 is completed, the grease distribution system 198 can remain coupled to the fracking valves 164 during fracking operations, or may alternatively be uncoupled from the fracking valves 164 prior to resumption of fracking operations.

While certain illustrative embodiments of the disclosure have been described above, it will be recognized and understood that various modifications can be made to the embodiments and the appended claims are intended to cover all such modifications which may fall within the spirit and scope of the disclosure.

What is claimed is:

1. A grease distribution system for lubricating a plurality of fracking valves on a wellhead, comprising:
 a distribution manifold configured for mounting on or adjacent to the wellhead, the distribution manifold including a plurality of manifold valves configured for coupling in fluid communication with the fracking valves, respectively, on the wellhead;
 a grease pump disposed in fluid communication with the distribution manifold;
 a plurality of safety valves disposed in fluid communication with the plurality of manifold valves, respectively, of the distribution manifold;
 a plurality of fracking valve inlet couplings disposed in fluid communication with the plurality of safety valves, respectively, and configured for coupling in fluid communication with the fracking valves, respectively, on the wellhead; and
 a plurality of grease pressure gauges disposed in fluid communication with and between the plurality of safety valves and the plurality of fracking valve inlet couplings, respectively.

2. The grease distribution system of claim 1 wherein the distribution manifold comprises at least one valve mount plate configured for mounting on the wellhead, and wherein the plurality of manifold valves is carried by the at least one valve mount plate.

3. The grease distribution system of claim 1 further comprising a stand having a stand base, a pair of stand legs upward-standing from the stand base and at least one valve mount plate carried by the stand legs, and wherein the plurality of manifold valves of the distribution manifold are carried by the at least one valve mount plate.

4. The grease distribution system of claim 1 further comprising a skid, and wherein the distribution manifold is carried by the skid.

5. The grease distribution system of claim 1 further comprising a trailer, and wherein the distribution manifold is carried by the trailer.

6. The grease distribution system of claim 2 wherein the at least one valve mount plate comprises an upper valve mount plate and a lower valve mount plate, and the plurality of manifold valves comprises a first plurality of manifold valves carried by the upper valve mount plate and a second plurality of manifold valves carried by the lower valve mount plate.

7. A grease distribution system for lubricating a plurality of fracking valves on a wellhead, comprising:
 a distribution manifold configured for mounting on or adjacent to the wellhead, the distribution manifold including:
  a distribution manifold inlet coupling;
  a stroke counter disposed in fluid communication with the distribution manifold inlet coupling;
  a grease meter disposed in fluid communication with the distribution manifold inlet coupling;
  an inlet conduit disposed in fluid communication with the grease meter;
  a main valve conduit disposed in fluid communication with the inlet conduit; and
  a plurality of manifold valves disposed in fluid communication with the main valve conduit, the plurality of manifold valves configured for coupling in fluid communication with the fracking valves, respectively, on the wellhead; and
 a grease pump coupled in fluid communication with the distribution manifold inlet conduit.

8. The grease distribution system of claim 7 wherein the distribution manifold comprises at least one valve mount plate configured for mounting on the wellhead, and wherein the plurality of manifold valves is carried by the at least one valve mount plate.

9. The grease distribution system of claim 7 further comprising a stand having a stand base, a pair of stand legs upward-standing from the stand base and at least one valve mount plate carried by the stand legs, and wherein the plurality of manifold valves of the distribution manifold are carried by the at least one valve mount plate.

10. The grease distribution system of claim 7 further comprising a plurality of safety valves disposed in fluid communication with the plurality of manifold valves, respectively, of the distribution manifold and a plurality of fracking valve inlet couplings disposed in fluid communication with the plurality of safety valves, respectively, and configured for coupling in fluid communication with the fracking valves, respectively, on the wellhead, and a plurality of grease pressure gauges disposed in fluid communication with and between the plurality of safety valves and the plurality of fracking valve inlet couplings, respectively.

11. The grease distribution system of claim 10 further comprising a skid, and wherein the distribution manifold is carried by the skid.

12. The grease distribution system of claim 7 further comprising a trailer, and wherein the distribution manifold is carried by the trailer.

13. The grease distribution system of claim 8 wherein the at least one valve mount plate comprises an upper valve mount plate and a lower valve mount plate, and the plurality of manifold valves comprises a first plurality of manifold valves carried by the upper valve mount plate and a second plurality of manifold valves carried by the lower valve mount plate.

\* \* \* \* \*